US010454283B2

(12) United States Patent
Kudo et al.

(10) Patent No.: US 10,454,283 B2
(45) Date of Patent: Oct. 22, 2019

(54) BATTERY SYSTEM MONITORING APPARATUS AND ELECTRIC STORAGE DEVICE INCLUDING THE SAME

(71) Applicant: HITACHI AUTOMOTIVE SYSTEMS, LTD., Hitachinaka-shi, Ibaraki (JP)

(72) Inventors: Akihiko Kudo, Hitachinaka (JP); Mutsumi Kikuchi, Hitachinaka (JP); Akihiko Emori, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/596,700

(22) Filed: May 16, 2017

(65) Prior Publication Data
US 2017/0250545 A1 Aug. 31, 2017

Related U.S. Application Data

(63) Continuation of application No. 14/352,227, filed as application No. PCT/JP2011/074173 on Oct. 20, 2011, now Pat. No. 9,673,640.

(51) Int. Cl.
*B60L 58/22* (2019.01)
*H02J 7/00* (2006.01)
(Continued)

(52) U.S. Cl.
CPC ............ *H02J 7/0016* (2013.01); *B60L 50/51* (2019.02); *B60L 58/12* (2019.02); *B60L 58/22* (2019.02);
(Continued)

(58) Field of Classification Search
CPC ...... H02J 7/0014; H02J 7/0016; H02J 7/0018; H02J 7/0019; B60L 11/1866; H01M 2010/4271
(Continued)

(56) References Cited

U.S. PATENT DOCUMENTS 3,854,082 A * 12/1974 Nasby ................... H02J 7/008
320/160
5,578,914 A 11/1996 Morita
(Continued)

FOREIGN PATENT DOCUMENTS

JP 11-285162 A 10/1999
JP 2009-089484 A 4/2009

OTHER PUBLICATIONS

"Analog & digital Input—need to limit current" Kalpak & Antoinelg, Microchip.com, Published Nov. 27, 2005, Accessed Online Jun. 14, 2016, www.microchip.com/forums/m127763.aspx.

*Primary Examiner* — Robert Grant
*Assistant Examiner* — John T Trischler
(74) *Attorney, Agent, or Firm* — Volpe and Koenig, P.C.

(57) ABSTRACT

A battery system monitoring apparatus for monitoring a cell group having a plurality of battery cells, and includes a cell controller IC which monitors and controls the states of the plurality of battery cells. A battery controller controls the cell controller IC and a plurality of voltage detection lines measure the voltage across the terminals of the battery cell. The voltage detection lines connect positive and negative electrodes of the battery cell, respectively, to a plurality of voltage input terminals of the cell controller IC. A power line connects the positive electrode of the battery cell having the highest potential among the plurality of battery cells to a power supply terminal of the cell controller IC and a ground line which connects the negative electrode of the battery cell having the lowest potential among the plurality of battery cells to a ground terminal of the cell controller IC.

6 Claims, 11 Drawing Sheets

(51) Int. Cl.
*H01M 10/44* (2006.01)
*H01M 10/48* (2006.01)
*H02M 7/44* (2006.01)
*H02P 27/06* (2006.01)
*B60L 50/51* (2019.01)
*B60L 58/12* (2019.01)

(52) U.S. Cl.
CPC ....... *H01M 10/441* (2013.01); *H01M 10/482* (2013.01); *H02J 7/0014* (2013.01); *H02J 7/0021* (2013.01); *H02M 7/44* (2013.01); *H02P 27/06* (2013.01); *Y02T 10/7005* (2013.01); *Y02T 10/7061* (2013.01)

(58) Field of Classification Search
USPC .......................................................... 320/118
See application file for complete search history.

(56) References Cited

U.S. PATENT DOCUMENTS

| | | | |
|---|---|---|---|
| 5,742,148 A | 4/1998 | Sudo et al. | |
| 5,818,201 A | 10/1998 | Stockstad et al. | |
| 5,841,265 A | 11/1998 | Sudo et al. | |
| 5,982,150 A | 11/1999 | Sudo et al. | |
| 5,998,974 A | 12/1999 | Sudo et al. | |
| 6,054,841 A | 4/2000 | Sudo et al. | |
| 6,087,807 A | 7/2000 | Sudo et al. | |
| 6,097,177 A | 8/2000 | Sudo et al. | |
| 6,127,808 A | 10/2000 | Sudo et al. | |
| 6,157,165 A * | 12/2000 | Kinoshita | H02J 7/0019 320/116 |
| 6,181,108 B1 | 1/2001 | Sudo et al. | |
| 6,242,890 B1 | 6/2001 | Sudo et al. | |
| 6,624,614 B2 | 9/2003 | Mashiko | |
| 6,803,766 B2 | 10/2004 | Kobayashi et al. | |
| 6,919,706 B2 * | 7/2005 | Furukawa | G01R 19/16542 320/116 |
| 7,180,268 B2 | 2/2007 | Denning et al. | |
| 7,456,614 B2 | 11/2008 | Sato et al. | |
| 7,550,945 B2 * | 6/2009 | Iwabuchi | G01R 31/396 320/116 |
| 7,573,238 B2 * | 8/2009 | Kawai | B60L 3/0046 320/132 |
| 7,589,499 B2 | 9/2009 | Denning et al. | |
| 7,592,774 B2 * | 9/2009 | Morimoto | G01R 31/3835 320/116 |
| 7,649,340 B2 | 1/2010 | Sato et al. | |
| 7,911,178 B2 | 3/2011 | Kawata et al. | |
| 8,084,997 B2 | 12/2011 | Miyamoto | |
| 8,089,788 B2 * | 1/2012 | Jain | H02M 3/07 307/110 |
| 8,120,209 B2 | 2/2012 | Tanaka et al. | |
| 8,120,319 B2 | 2/2012 | Nakatsuji | |
| 8,193,763 B2 | 6/2012 | Kawata et al. | |
| 8,198,862 B2 | 6/2012 | Zhang et al. | |
| 8,258,792 B2 * | 9/2012 | Vandensande | G01R 31/396 324/426 |
| 8,269,460 B2 * | 9/2012 | Ishikawa | G01R 31/026 320/122 |
| 8,400,163 B2 * | 3/2013 | Miyamoto | G01R 19/10 324/434 |
| 8,405,358 B2 | 3/2013 | Li et al. | |
| 8,518,570 B2 * | 8/2013 | Kudo | H01M 10/425 320/116 |
| 8,723,481 B2 | 5/2014 | Zhang | |
| 8,754,654 B2 * | 6/2014 | Furukawa | H01M 10/441 320/101 |
| 8,907,676 B2 * | 12/2014 | Coenen | G01R 31/026 324/433 |
| 9,157,967 B2 * | 10/2015 | Firehammer | G01R 31/362 |
| 9,571,004 B2 * | 2/2017 | Lavieville | H02M 7/537 |
| 9,638,759 B2 * | 5/2017 | Coenen | G01R 31/026 |
| 9,927,465 B2 * | 3/2018 | Ohnuki | G01R 19/0084 |
| 2001/0011881 A1 | 8/2001 | Emori et al. | |
| 2001/0026161 A1 * | 10/2001 | Furukawa | G01R 31/396 324/679 |
| 2003/0044689 A1 | 3/2003 | Miyazaki et al. | |
| 2004/0036446 A1 | 2/2004 | Iwashima | |
| 2004/0041569 A1 * | 3/2004 | Furukawa | G01R 19/16542 324/433 |
| 2004/0051534 A1 | 3/2004 | Kobayashi et al. | |
| 2004/0178768 A1 | 9/2004 | Miyazaki et al. | |
| 2005/0156574 A1 | 7/2005 | Sato et al. | |
| 2005/0212484 A1 | 9/2005 | Denning et al. | |
| 2005/0212489 A1 | 9/2005 | Denning et al. | |
| 2005/0242775 A1 | 11/2005 | Miyazaki et al. | |
| 2007/0018613 A1 | 1/2007 | Miyazaki et al. | |
| 2007/0029967 A1 * | 2/2007 | Morimoto | G01R 31/3835 320/116 |
| 2007/0247115 A1 * | 10/2007 | Ishikawa | H02J 7/0016 320/119 |
| 2008/0219337 A1 | 9/2008 | Kawata et al. | |
| 2008/0284375 A1 | 11/2008 | Nagaoka et al. | |
| 2009/0021222 A1 | 1/2009 | Kudo et al. | |
| 2009/0051323 A1 | 2/2009 | Sato et al. | |
| 2009/0085516 A1 | 4/2009 | Emori et al. | |
| 2009/0140743 A1 | 6/2009 | Ohnuki et al. | |
| 2009/0284224 A1 | 11/2009 | Miyazaki et al. | |
| 2009/0295398 A1 * | 12/2009 | Ohnuki | G01R 19/10 324/429 |
| 2009/0309545 A1 * | 12/2009 | Kunimitsu | H02J 7/0016 320/118 |
| 2010/0052614 A1 | 3/2010 | Mariels | |
| 2010/0052624 A1 | 3/2010 | Li et al. | |
| 2010/0073004 A1 * | 3/2010 | Miyamoto | G01R 19/10 324/426 |
| 2010/0090540 A1 | 4/2010 | Tanaka et al. | |
| 2010/0134069 A1 | 6/2010 | Oosawa et al. | |
| 2010/0209748 A1 * | 8/2010 | Kudo | H01M 10/425 429/91 |
| 2011/0187326 A1 | 8/2011 | Kawata et al. | |
| 2011/0316549 A1 * | 12/2011 | Coenen | G01R 31/026 324/434 |
| 2012/0025836 A1 * | 2/2012 | Furukawa | H01M 10/441 324/434 |
| 2012/0249074 A1 | 10/2012 | Tsuchiya et al. | |
| 2012/0280573 A1 | 11/2012 | Ohkura et al. | |
| 2012/0306503 A1 | 12/2012 | Firehammer et al. | |
| 2012/0319654 A1 | 12/2012 | Li | |
| 2013/0057294 A1 | 3/2013 | Mizoguchi et al. | |
| 2013/0187612 A1 * | 7/2013 | Aiura | H01M 10/425 320/118 |
| 2014/0152261 A1 | 6/2014 | Yamauchi et al. | |
| 2014/0225622 A1 | 8/2014 | Kudo et al. | |
| 2014/0350878 A1 * | 11/2014 | Ohnuki | G01R 19/0084 702/64 |
| 2015/0108990 A1 * | 4/2015 | Coenen | G01R 31/026 324/426 |
| 2016/0003916 A1 * | 1/2016 | Firehammer | G01R 31/362 324/434 |

\* cited by examiner

BATTERY SYSTEM MONITORING APPARATUS AND ELECTRIC STORAGE DEVICE INCLUDING THE SAME

TECHNICAL FIELD

The present invention relates to a battery system monitoring apparatus and an electric storage device including the same.

BACKGROUND ART

An assembly battery (battery system) configured by connecting, in series or in series-parallel, a plurality of cell groups each including a plurality of battery cells of secondary battery in series is used for a hybrid electric vehicle (HEV), an electric vehicle (EV), or the like to secure a desired high voltage. In such an assembly battery, a cell controller which measures a cell voltage (the voltage across the terminals of a battery cell) and performs balancing discharge for equalizing (balancing) the states of charge (SOC, State of Charge), that is, the remaining capacities is provided in a monitoring apparatus of the assembly battery to calculate the remaining capacity of each battery cell and protect and control the battery cells, and accordingly the assembly battery is controlled (for example, see PTL 1). Moreover, the cell controller includes a plurality of integrated circuits (cell controller ICs) and controls the plurality of cell groups.

The SOC of each battery cell is calculated from the open circuit voltage (OCV) of the battery cell. In other words, the SOC of each battery cell is calculated from the voltage across the terminals of the battery cell measured in a state where the battery system is under no load conditions, in other words, in a state where the battery system is not connected to things such as an inverter which generates three phase AC power from DC power from the battery system to supply the three phase AC power to a drive motor of HEV or EV. The voltage across the terminals of each battery cell is measured by being input into a voltage input terminal of the cell controller IC. The voltage input terminal of the cell controller IC is provided with an RC filter to remove noise accompanied with the charge/discharge of the battery system.

CITATION LIST

Patent Literature

PTL 1: Japanese Patent Application Laid-Open (JP-A) No. 2009-89484

SUMMARY OF INVENTION

Technical Problem

Electric leakage may occur on the voltage input terminal side due to various causes such as the deterioration of a capacitor of the RC filter provided to the input terminal of the cell controller IC, the deterioration of a diode for protection against ESD provided in the cell controller IC, and an insulation failure in the vicinity of a voltage detection terminal of the cell controller IC. If electric leakage occurs, the voltage across the terminals of each battery cell of the cell controller IC is not measured correctly, and a correct value for the SOC of each battery cell cannot also be obtained. If balancing discharge is performed on the battery cells based on such incorrect SOCs, it may lead to overcharge or over-discharge.

Solution to Problem (1)
According to a first aspect of the present invention, there is provided a battery system monitoring apparatus for monitoring a cell group having a plurality of battery cells connected in series, the battery system monitoring apparatus including: a cell controller IC which monitors and controls the states of the plurality of battery cells of the cell group; a battery controller which controls the cell controller IC; a plurality of voltage detection lines for measuring the voltage across the terminals of the battery cell, the voltage detection lines connecting positive and negative electrodes of the battery cell, respectively, to a plurality of voltage input terminals of the cell controller IC; a power line which connects the positive electrode of the battery cell having the highest potential among the plurality of battery cells to a power supply terminal of the cell controller IC; and a ground line which connects the negative electrode of the battery cell having the lowest potential among the plurality of battery cells to a ground terminal of the cell controller IC, wherein the battery cells are each provided with a balancing switch which performs balancing discharge on the battery cell, the balancing switch being connected between the voltage detection line connected to the positive electrode of the battery cell and the voltage detection line connected to the negative electrode, and a balancing resistor connected in series to the balancing switch, the voltage detection lines are provided with voltage input resistors in series, and the battery controller controls the cell controller IC and sets the effective resistance value of the balancing switch to a predetermined value or more such that the battery cell is not overcharged even upon the occurrence of leakage between two voltage detection lines out of the plurality of voltage detection lines, between the power line and any of the plurality of voltage detection lines, or between the ground line and any of the plurality of voltage detection lines.

(2)
According to a second aspect of the present invention, in the battery system monitoring apparatus according to the first aspect, it is preferable that the predetermined value of the effective resistance value of the balancing switch is a value calculated from the resistance value of the voltage input resistor provided to the voltage detection line, an overcharge protection voltage value of the battery cell, and a voltage value when the battery cell has an SOC of 100%.

(3)
According to a third aspect of the present invention, in the battery system monitoring apparatus according to the second aspect, it is preferable that the effective resistance value of the balancing switch is set to the value calculated from the resistance value of the balancing resistor and the duty cycle of on and off of the balancing switch.

(4)
According to the fourth aspect of the present invention, in the battery system monitoring apparatus according to any one of the first to third aspects, it is preferable that the battery system monitoring apparatus includes a plurality of the cell controller ICs to monitor a plurality of the cell groups.

(5)
According to a fifth aspect of the present invention, there is provided an electric storage device including the battery system monitoring apparatus according to any one of the first to fourth aspects, and a battery system.

(6)

According to a sixth aspect of the present invention, there is provided an electric drive apparatus including the electric storage device according to the fifth aspect.

(7)

According to a seventh aspect of the present invention, there is provided a method for calculating the predetermined value of the duty cycle of on and off of the balancing switch of the battery system monitoring apparatus according to the first aspect, wherein the predetermined value is a value calculated from the resistance value of the voltage input resistor provided to the voltage detection line having the leakage, an overcharge protection voltage value of the battery cell, and a voltage value when the battery cell has an SOC of 100%.

(8)

According to an eighth aspect of the present invention, in the method for calculating the predetermined value of the duty cycle of on and off of the balancing switch according to the seventh aspect, it is preferable that the effective resistance value of the balancing switch is set to the value calculated from the resistance value of the balancing resistor and the duty cycle of on and off of the balancing switch.

Advantageous Effects of Invention

A battery system monitoring apparatus according to the present invention is used to enable an electric storage device including the battery system monitoring apparatus to reliably avoid overcharge of a secondary cell and improve the safety of the electric storage device and an electric drive vehicle equipped with the electric storage device, such as HEV or EV.

DESCRIPTION OF EMBODIMENTS

An embodiment of the present invention is hereinafter described with reference to FIGS. 1 to 11. The embodiment described below is an example of a case where an electric storage device including a battery system monitoring apparatus according to the present invention is applied to an electric storage device including a battery system used for a hybrid electric vehicle (HEV) or the like. The present invention can be widely applied to various electric storage devices to be mounted on a plug-in hybrid electric vehicle (PHEV), an electric vehicle (EV), a railway vehicle, and the like, not limited to HEV.

In the following embodiment, a lithium-ion battery having the voltage between 3.0 to 4.2 V (average output voltage: 3.6 V) is assumed to be an electric storage/discharge device as a minimum unit of control. However, other than the lithium-ion battery, any electricity storable and dischargeable device which controls its use if the SOC (State of Charge) is too high (overcharge) or too low (over-discharge) can be fine. Here, it is collectively called an electric cell or a battery cell, or simply a cell.

Moreover, in the following embodiment, a plurality of (roughly several to a dozen or so) battery cells connected in series is called a cell group, and a plurality of the cell groups connected in series is called a battery module. Furthermore, a plurality of the cell groups or battery modules connected in series or series-parallel is designated as a battery system. The cell group, the battery module, and the battery system are collectively called an assembly battery. Each cell group is usually provided with a cell controller IC which detects the cell voltage of each battery cell, and monitors the state of the cell while performing a balancing operation and the like.

Figure 1:
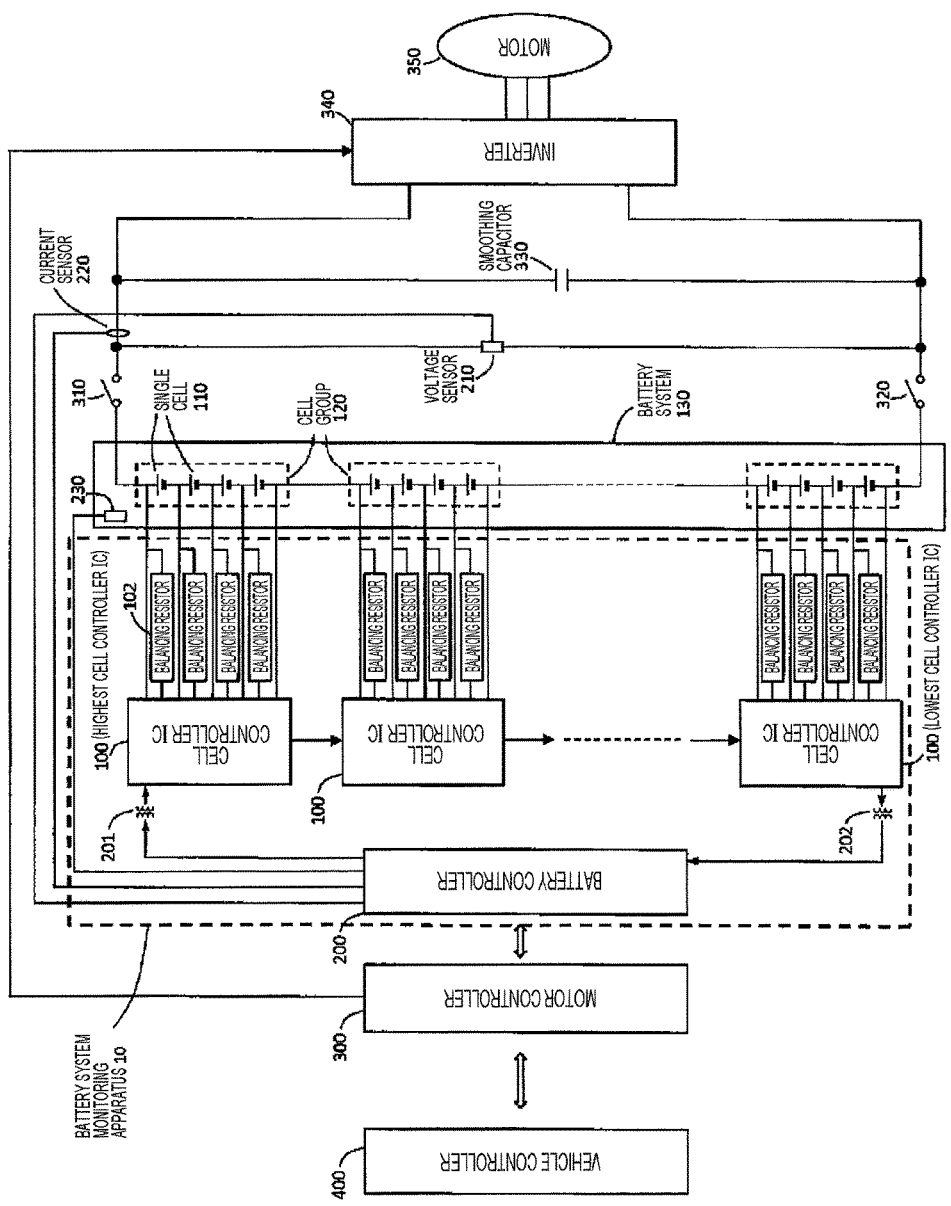
FIG. 1 is a diagram illustrating an entire configuration of an electric drive apparatus of a hybrid electric vehicle including a battery monitoring apparatus of an assembly battery of an embodiment.

FIG. 1 illustrates a configuration example of an electric drive apparatus for a hybrid electric vehicle on which the electric storage device including the battery system monitoring apparatus according to the present invention is mounted. The electric drive apparatus for a hybrid electric vehicle includes a vehicle controller 400, a motor controller 300, a battery controller 200, a plurality of cell controller ICs 100, a battery system 130, an inverter 340, a motor 350, and the like. Among them, the vehicle controller 400, the motor controller 300, the battery controller 200, the cell controller ICs 100, and the inverter 340 mutually exchange information via a communication circuit installed in a vehicle. The battery system 130 is a plurality of cell groups 120 connected in series, and the cell group 120 is configured by further connecting a plurality of secondary battery cells 110, such as lithium-ion batteries, in series. Moreover, a battery system monitoring apparatus 10 is configured by including the battery controller 200, the plurality of cell controller ICs 100, and connection circuits having resistors, capacitors, and the like, the connection circuits being provided between the cell controller ICs 100 and the cell groups 120. The electric storage device includes the battery system monitoring apparatus 10 and the battery system 130.

The communication circuit between the battery controller 200 and the plurality of cell controller ICs 100 is connected in the shape of a loop. A signal is transmitted from the battery controller 200 to the highest cell controller IC 100 via a signal isolator 201. The signal is further transmitted in series sequentially from the highest cell controller IC 100 to the lowest cell controller IC 100. Finally, the signal is transmitted from the lowest cell controller IC 100 to the battery controller 200 via a signal isolator 202. The battery controller 200 can exchange information with all the cell controller ICs 100 via the loop-shaped communication circuit.

The example where the signal is transmitted via the loop-shaped communication circuit is illustrated here. However, a two-way communication circuit can be used for the configuration. In this case, the need of the signal isolator 202 can be eliminated. Furthermore, although not illustrated, it is also possible to connect the communication circuit in parallel from the battery controller 200 to all the cell controller ICs 100, and transmit the signal in parallel.

The vehicle controller 400 controls the travel speed, drive and braking force, or the like of the vehicle based on an operation signal from a vehicle driving operation device such as an acceleration pedal, a brake pedal, a gear lever, or the like which is operated by a driver of the hybrid electric vehicle. The motor controller 300 controls the battery controller 200 and the inverter 340 based on a speed instruction and a drive and braking force instruction from the vehicle controller 400, and controls the rotational speed and torque of the vehicle travel drive motor 350.

The battery controller 200 controls the charge/discharge and the SOC (State of Charge) of the battery system 130 based on the voltage, current, and temperature of the battery system 130 detected by a voltage sensor 210, a current sensor 220, and a temperature sensor 230 while controlling the cell controller ICs 100 to control the SOCs of the plurality of battery cells (hereinafter simply referred to as the cells) 110 configuring the battery system 130 and performing discharge for correcting variations in SOC (hereinafter referred to as balancing discharge) so as to prevent an overcharge state.

In an assembly battery control device of one embodiment illustrated in FIG. 1, a battery system including a plurality of the cell groups 120 connected in series each having, for example, four cells 110 connected in series is illustrated. The number of the battery cells 110 constituting the cell group 120 may be four or more. One pursuant to the specification of the cell group 120 is used as the cell controller IC 100.

The battery system 130 to be mounted on the hybrid electric vehicle is commonly a high-voltage and high-capacity battery system where many cells or cell groups are connected in series-parallel, and the voltage across the system is several 100 V. Naturally, the present invention can also be applied to such a high-voltage and high-capacity battery system.

The plurality of the cells 110 configuring the battery system is grouped into predetermined numbers, and the cell controller IC 100 is provided to each cell group 120. For example, if 100 cells 110 are grouped into fours in the battery system 130 where the 100 cells 110 are connected in series, 25 cell controller ICs 100 are used. The cell controller IC 100 detects the voltages across the terminals of the cells constituting each cell group 120 and transmits the voltages to the battery controller 200. The passage of a balancing current is controlled for each cell 110 at the instruction of the battery controller 200. A balancing resistor 102 is a resistor for limiting the current of the discharge of each cell for correcting variations in the SOCs of the cells (balancing discharge), and is provided to each cell 110.

DC power charged in the battery system 130 is supplied to a smoothing capacitor 330 and the inverter 340 via a positive electrode-side contactor 310 and a negative electrode-side contactor 320, and converted by the inverter 340 into AC power, which is applied to the AC motor 350 to drive the AC motor 350. The conversion from DC power to AC power is made by switching by a switching element (not illustrated) included in the inverter 340. On the other hand, upon braking of the vehicle, AC power generated by the AC motor 350 is converted into DC power by a diode element (not illustrated) included in the inverter 340, and the smoothing capacitor 330. The DC power is applied to the battery system 130 via the positive electrode-side contactor 310 and the negative electrode-side contactor 320 to charge the battery system 130.

With the operation of the inverter 340, ripple noise and switching noise occur. The noise is reduced by the smoothing capacitor 330 up to a point, but not perfectly. The noise flows into the battery system 130 and a noise voltage proportional to a noise current is superimposed on the voltage across the terminals of each cell. The noise leads to a cell voltage detection error. Accordingly, the noise needs to be suppressed, using the RC filter or the like, for a voltage signal to be input into a voltage measurement circuit (not illustrated) for measuring voltage. The voltage measurement circuit (not illustrated) is provided inside the cell controller IC 100 and its details are omitted.

(Examples of RC Filter Circuit and Balancing Circuit)

Figure 2:
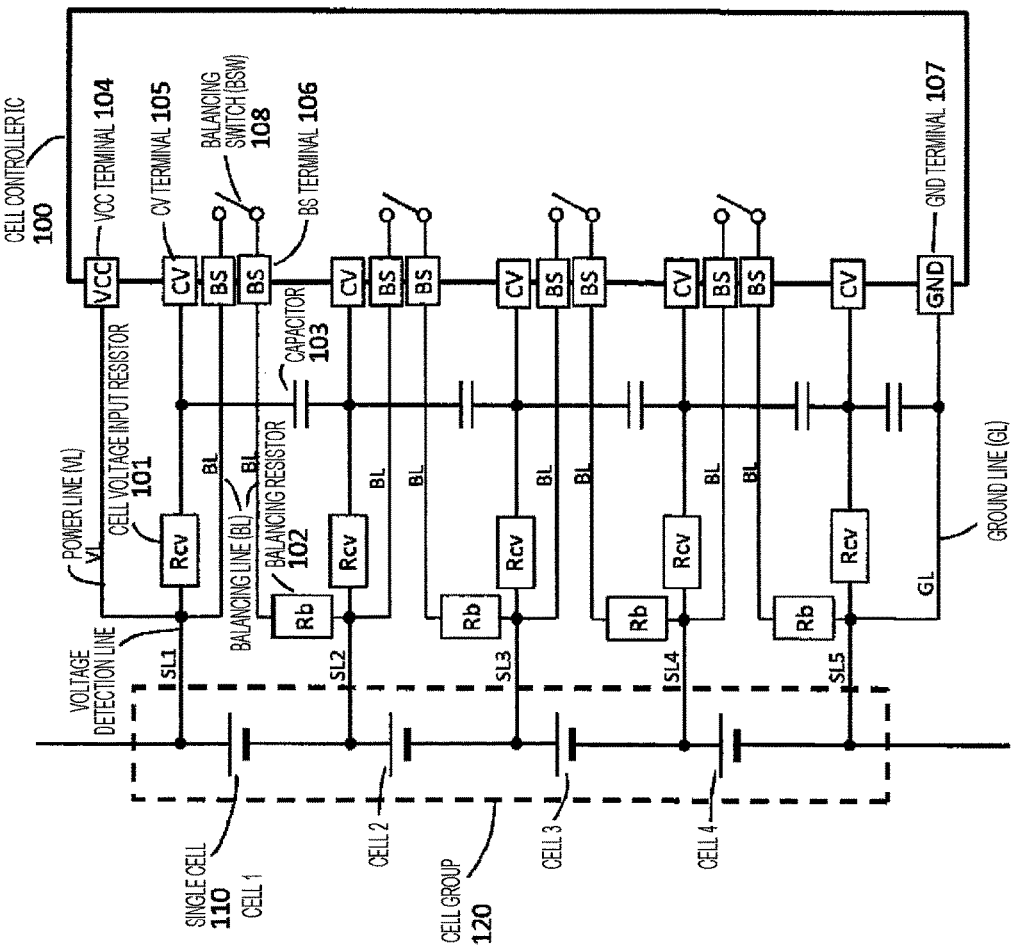
FIG. 2 illustrates examples of an RC filter circuit for detecting the cell voltage and a balancing circuit.

FIG. 2 illustrates examples of an RC filter circuit for detecting the cell voltage using the cell controller IC 100, and a balancing circuit. In one cell group 120 illustrated in FIG. 1, the positive and negative terminals of four battery cells 110 connected in series are connected to cell voltage input terminals (CV terminals) 105 of the cell controller IC 100 via voltage detection lines SL1 to SL5. A cell voltage input resistor (Rcv) 101 forming an RC filter is provided to each of the voltage detection lines SL1 to SL5. Moreover, a capacitor 103 is connected between the voltage detection lines connected to the positive and negative terminals of each cell, that is, two adjacent voltage detection lines to form the RC filter.

The cell controller IC 100 includes a GND terminal (GND) 107 and a VCC terminal (VCC) 104. The GND terminal is connected by a ground line (GL) to a negative electrode of the battery cell having the lowest potential among the four battery cells connected in series. Moreover, the Vcc terminal is connected by a power line (VL) to a positive electrode of the battery cell having the highest potential among the four battery cells connected in series. The highest potential of the cell group supplied via the power line is used as an operating power supply Vcc of the cell controller IC 100.

The resistance value of the cell voltage input resistor (Rcv) 101 and the resistance value of the balancing resistor (BS resistor, Rb) are also represented as Rcv and Rb.

In the description, the voltage detection lines indicate wiring from the positive and negative electrodes of each battery cell to the input of a multiplexer (not illustrated), provided inside the cell controller IC 100, for selecting the voltage detection line to measure the voltage across the terminals of each battery cell by the voltage measurement circuit (not illustrated).

A series circuit of a balancing switch (BSW) 108 and the balancing resistor (BS resistor, Rb) 102 is connected in parallel to each cell, and balancing discharge is performed on each cell by the control of the balancing switch 108. The balancing switch 108 is provided inside the cell controller IC 100, and configured of, for example, a MOSFET switch. The balancing switch 108 is connected by two wires (referred to as the balancing lines BL) via balancing terminals (BS terminals) 106 to two voltage detection lines connected to the positive and negative terminals of the cell for the balancing switch.

(Modification 1 of RC Filter Circuit)

Figure 3:
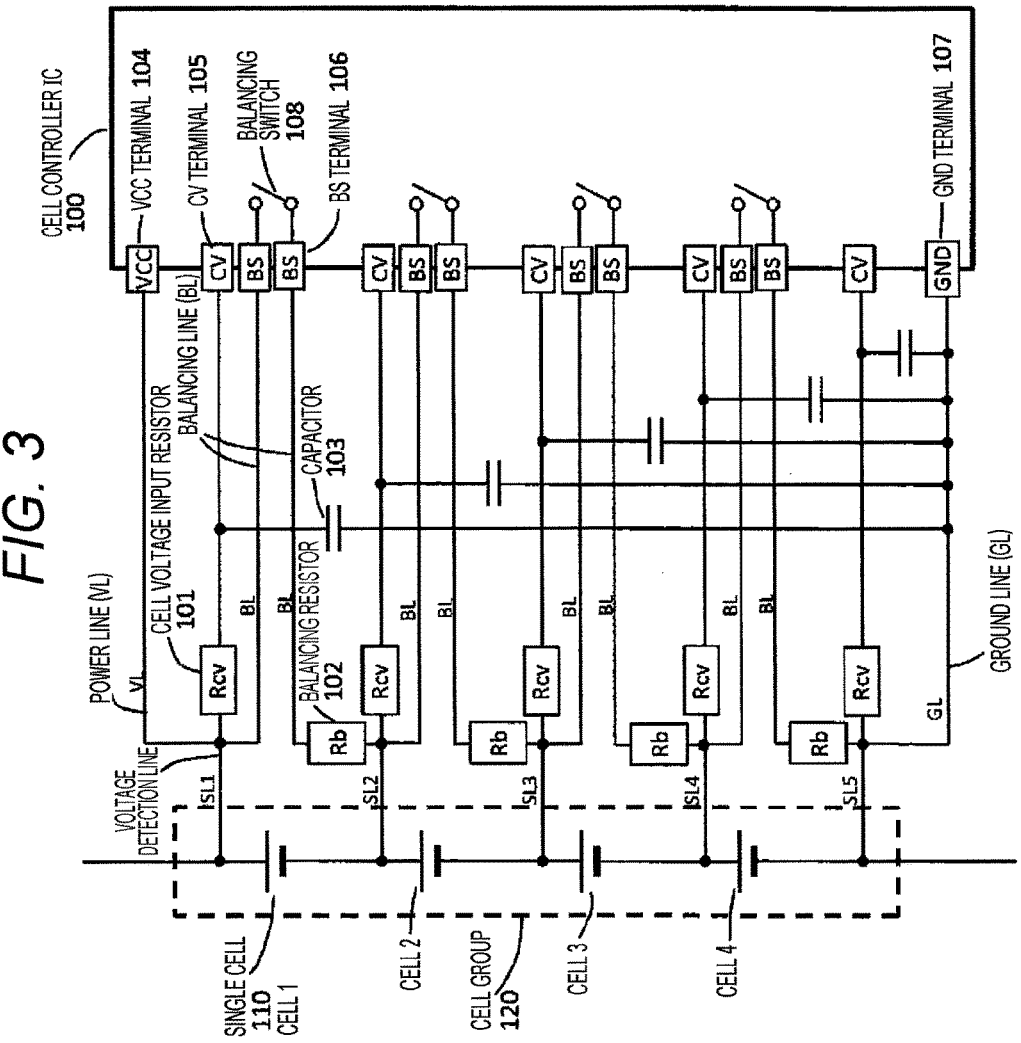
FIG. 3 illustrates other examples of the RC filter circuit for detecting the cell voltage and the balancing circuit.

FIG. 3 is another example of the RC filter circuit, and the capacitor 103 of the RC filter is connected to the GND terminal 107 of the cell controller IC 100. In the form of the RC filter in FIG. 2, if four capacitors having the same capacity are used, the effective capacitor capacity of the RC filter for a cell to be connected changes. Therefore, the cutoff frequency characteristics of the RC filter vary depending on the battery cell. It is necessary to change the RC constant for each cell in order to have the same frequency characteristics. In the form of FIG. 3, the RC constant can be the same. However, it is necessary to increase the withstand voltage of the capacitor 103 so as to withstand the total voltage of four battery cells.

(Modification 2 of RC Filter Circuit)

Figure 4:
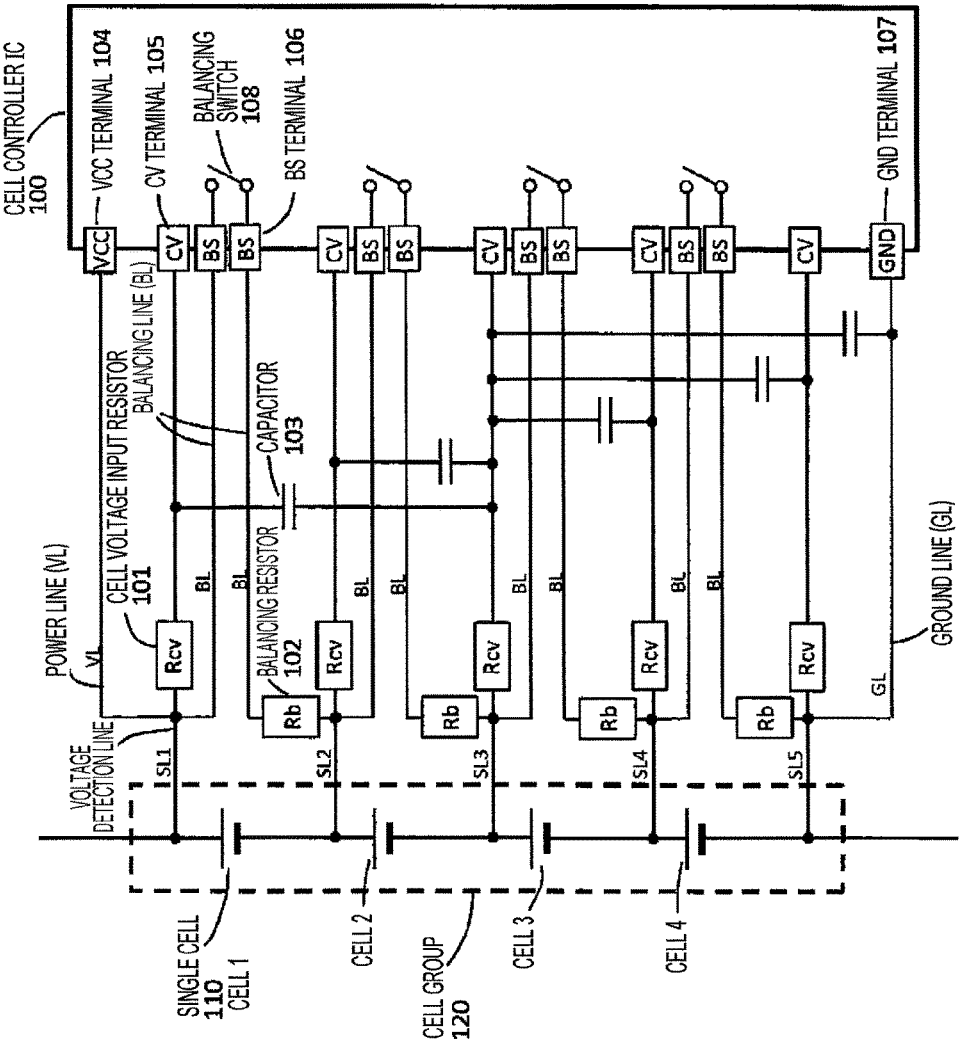
FIG. 4 illustrates still other examples of the RC filter circuit for detecting the cell voltage and the balancing circuit.

FIG. 4 is still another example of the RC filter circuit, and a connection point of the capacitor 103 is connected to the voltage detection line (SL3 in FIG. 4) of the midpoint potential of the series-connected cells. Also in this form, the constants of the RC filters connected to the cells are the same. Moreover, there is the advantage that the withstand voltage of the capacitor 103 can be reduced to a half of the RC filter circuit of FIG. 3.

The capacitor 103 is connected between the voltage detection line SL5 and the ground line (GL) in FIG. 2. In FIG. 3, the capacitor 103 is connected between each of the voltage detection lines SL1 to SL5 and the ground line (GL). In FIG. 4, the capacitor 103 is connected between the voltage detection line SL3 and the ground line (GL). It is also possible to configure a circuit where the capacitors 103 are connected between these voltage detection lines and the power line (VL) instead of connecting the capacitors 103 between these voltage detection lines and the ground line.

The operation of such a circuit configuration is also similar to the circuit configurations illustrated in FIGS. 2 to 4, and can easily be understood from the following description with reference to FIGS. 2 to 4. Therefore, a diagram of the circuit configuration where the capacitor 103 is connected between the voltage detection line and the power line (VL) is omitted.

(Characteristics of Lithium-Ion Battery and Necessity of Balancing Discharge)

The characteristics of the lithium-ion battery is described here as an example of a battery cell used in the electric storage device including the assembly battery monitoring apparatus according to the present invention. The causes of variations in the SOCs of a plurality of battery cells configuring the battery system 130 include various factors such as variations in the self-discharge rates of the cells, variations in charging/discharging efficiency, and variations in a control circuit's operating consumption current and dark current during stop. However, a battery to be mounted on a passenger vehicle is left standing for a relatively long time and accordingly the main cause is variations in self-discharge (natural discharge). In a case of the lithium-ion battery, the OCV (open circuit voltage) of each battery cell is measured at the startup of the system, and the SOC of each battery cell is calculated from the measurements. When the OCV is high, the SOC is also high. Therefore, balancing discharge is performed on the cell having a high OCV to decrease the SOC. Accordingly, the SOCs of a plurality of cells configuring the battery system 130 are adjusted in line.

The lithium-ion battery has no reaction of absorbing oxygen generated at the negative electrode in the overcharge state as in a nickel-hydrogen battery and a nickel-cadmium battery. Accordingly, variations in SOC cannot be reduced by overcharging. Therefore, a balancing discharge function is an important function for the lithium-ion battery. If there is no balancing discharge function, variations in SOC occur. Accordingly, if it used as a battery, that is, a battery system (assembly battery) is used, a cell at a high SOC and a cell at a low SOC arise. Charging/discharging is controlled by the total voltage, that is, the average SOC in the battery system. Accordingly, during charge/discharge, the cell at a low SOC may be over-discharged, and the cell at a high SOC may be overcharged.

In the lithium-ion battery, the short circuit between the positive and negative electrodes may be caused by lead being a negative electrode current collector eluting at a low SOC and precipitating as a dendrite. Hence, the cells are charged as appropriate so as not to be over-discharged. Moreover, when the lithium-ion battery is overcharged, reactions such as the decomposition of the electrolyte, and the decomposition of positive electrode and negative electrode active materials occur. The reactions are irreversible and also the temperature and internal pressure in the battery increase. In order to avoid such an overcharge state, a structure to release the internal pressure safely by providing the cell with a gas release vent is adopted in the lithium-ion battery.

In a battery where many cells are connected in series-parallel, the total voltage of the battery is detected by a total voltage detection circuit while the voltages of all the cells are detected by the voltage measurement circuits in the cell controller ICs 100 to control charging/discharging of the battery with these detected values. Accordingly, there is a low risk that the entire battery is overcharged or over-discharged is low. However, if the voltage across a certain cell is not measured normally due to a failure (the deterioration of the capacitor of the RC filter, the deterioration of the diode for protection against ESD (see, for example, FIG. 5 of JP-A No. 2010-193589) provided in the cell controller IC 100, an insulation failure in the vicinity of the voltage detection terminal of the cell controller IC 100, or the like) on a voltage input side into the voltage input terminal of the cell controller IC 100, normal balancing discharge is not performed, and the cell is overcharged in some cases. For example, assuming that such a trouble that detects the voltage across a certain cell to be low occurs on the input side of the voltage measurement circuit of the cell controller IC 100, even if the actual OCV of the cell is not low, a low voltage is detected. Accordingly, the cell is eliminated from the target of balancing discharge, and another cell is targeted for balancing discharge. Hence, after the end of balancing discharge, the SOC of the another cell becomes lower according to the amount of balancing discharge. Conversely, the SOC of the cell relatively becomes higher accordingly. All the cells (the battery system) are charged in a state where balancing discharge is performed on the cell which appears to have a high OCV and variations in OCV are reduced.

Accordingly, if such an operation is repeated, the apparent total voltage of the battery system remains normal while only the cell is overcharged.

In order to prevent such an overcharge state accompanied by a failure on the input side of the cell voltage measurement circuit, and avoid false measurement of the cell voltage due to a trouble in the voltage measurement circuit itself, the control device of a known assembly battery has been configured such that the cell controller IC 100 including the voltage measurement circuit is provided with two circuits so as to have a dual system for the voltage measurement circuit for all the cells and accordingly even if a failure occurs in the voltage measurement function of one of the cell controller ICs 100, the cell voltage can reliably be detected by the voltage measurement function in the other cell controller IC 100.

(Behavior During Overcharge of Lithium-Ion Battery)

Figure 5:
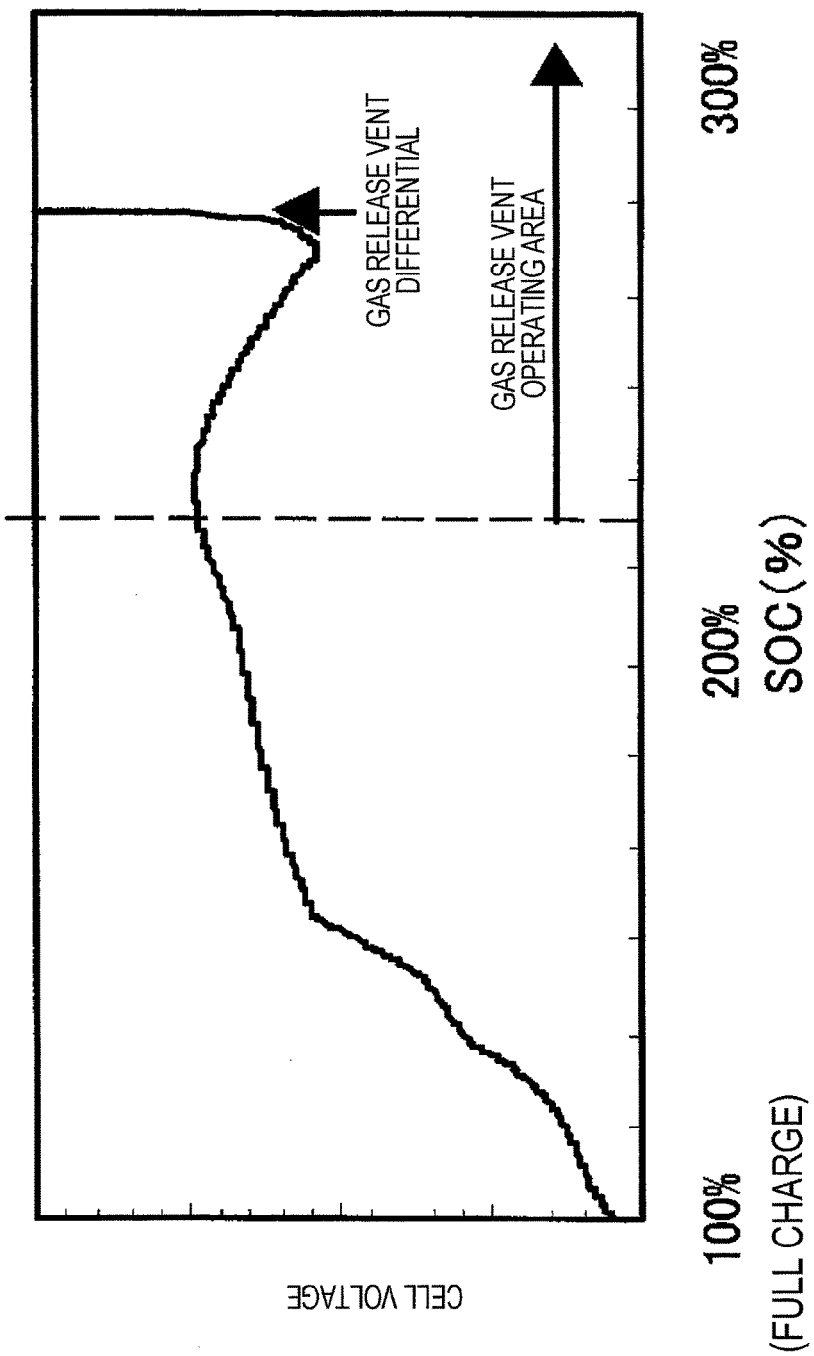
FIG. 5 is a diagram illustrating the change of the cell voltage with respect to the SOC and the operation of a gas release vent when a lithium-ion battery is charged with constant current to be intentionally placed in the overcharge state.

Next, a behavioral example in the overcharge state of the lithium-ion battery is described. FIG. 5 is a diagram illustrating the change of the cell voltage with respect to the SOC and the operation of the gas release vent when the lithium-ion battery is charged with constant current to intentionally bring about the overcharge state. As can clearly be seen from the diagram, the cell voltage increases as the SOC increases. The internal pressure increases at an SOC of approximately 280%, and the gas release vent operates. In the lithium-ion battery, the gas release vent may operate at an SOC of 230% or more. Accordingly, SOCs of 230% and more are set as a gas release vent operating area. An SOC at the lowest limit of the gas release vent operating area largely depends on the characteristics of the lithium-ion battery, and varies depending on various conditions such as a positive electrode active material, a negative electrode active material, and electrolyte composition. The gas release vent operating area illustrated in FIG. 5 illustrates an example.

However, the characteristic that if the SOC increases, the cell voltage increases to approach the gas release vent operating area is a characteristic common to all lithium-ion batteries. Hence, in the control device of the known battery system, the cell voltage to be determined as overcharge is set as the cell voltage between the cell voltage at an SOC of 100% and the cell voltage of the SOC at the lowest limit of the gas release vent operating area. The detection voltage of a redundant overcharge detection circuit is also set to the cell voltage value within the above SOC range, and charging/discharging is controlled so as not to be charged up to the voltage leading to overcharge, or more.

(Occurrence of Leakage)

As described above, leakage may occur due to the deterioration of the capacitor of the RC filter, the deterioration of the diode for protection against ESD provided in the cell controller IC 100, an insulation failure in the vicinity of the voltage detection terminal of the cell controller IC 100, or the like. A description is given below assuming that among them, leakage has occurred in the capacitor of the RC filter. Also if leakage has occurred due to another cause, it can be understood totally similarly, and the operation of the battery system according to the present invention, which is described below, can be applied.

Moreover, in the following, a description is given of a case where the capacitor 103 of the RC filter is connected in parallel to each cell between two voltage detection lines connected to the positive electrode and negative electrode of the cell, as illustrated in FIG. 2. A cell whose detection voltage decreases due to the occurrence of leakage in the capacitor 103 is called a leakage-occurring cell. However, this is merely the designation, and does not mean that leakage is actually occurring in the cell.

(Cell Voltage Measurement Value Upon Occurrence of Leakage in Capacitor of RC Filter)

Figure 6:
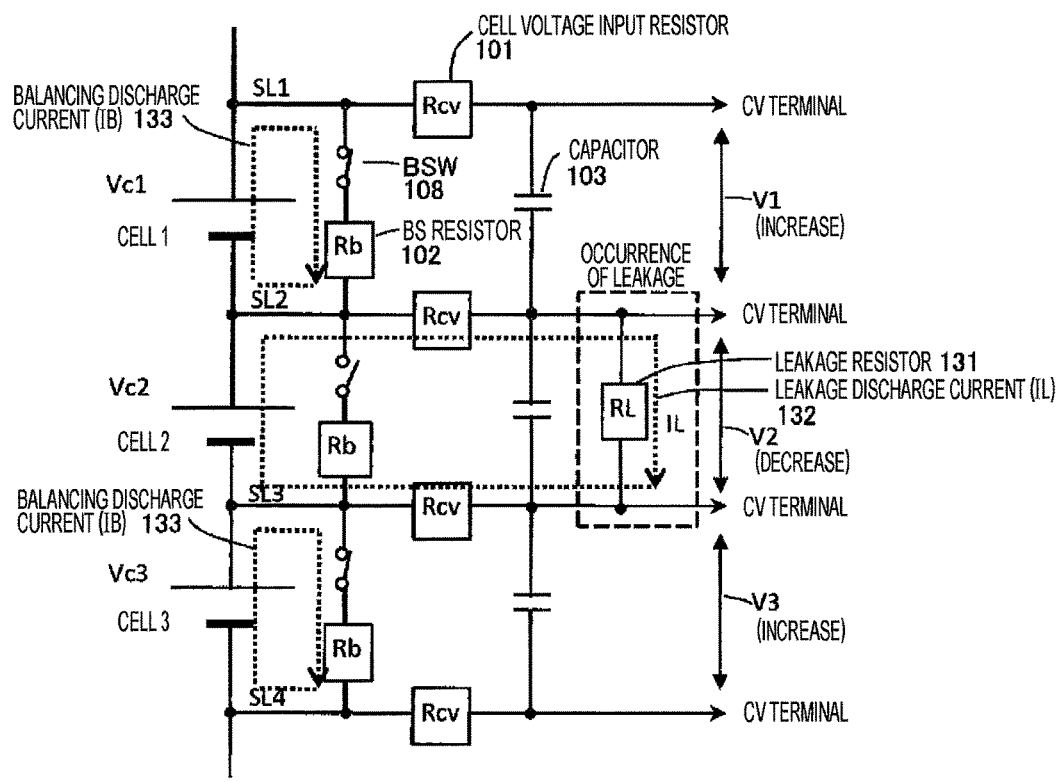
FIG. 6 is a diagram illustrating leakage current at the time of the occurrence of leakage between two voltage detection lines in an easily understandable manner, and illustrating a balancing operation at the time.

In order to simplify the description here, a description is given assuming that leakage has occurred in the capacitor 103 connected between two voltage detection lines connected to the positive electrode and negative electrode of the cell in the middle of three cells connected in series. The leakage of the capacitor 103 is represented by a leakage resistor (RL) 131 connected in parallel to the capacitor 103. FIG. 6 is an illustration where the balancing switches 108 provided in the cell controller IC 100 of FIG. 2 have been removed to the outside, and where the description of the cell controller IC 100 is omitted, to make the diagram easy to see.

Assume that the actual voltage across a cell 2 is Vc2. A voltage V2 between the voltage input terminals (CV terminals) of the cell 2 of the cell controller IC 100 is indicated by the following equation (1).

$$V2 = Vc2 \times RL/(2 \times Rcv + RL) \quad (1)$$

A leakage current IL flowing through the leakage resistor (RL) 131 between the two CV terminals to which the cell 2 is connected also flows through voltage input resistors Rcv of the voltage detection lines SL2 and SL3. With voltage drop by the two voltage input resistors, the voltage between the CV terminals is measured to be lower than the actual voltage of the cell 2.

Moreover, assume that the actual voltages of the cells 1 and 3 are respectively Vc1 and Vc3. A voltage V1 between the CV terminals connected to the voltage detection lines SL1 and SL2, the voltage V1 being the detection voltage of the cell 1, and a voltage V3 between the CV terminals connected to the voltage detection lines SL3 and SL4, the voltage V3 being the detection voltage of the cell 3, are indicated by the following equations (2) and (3), respectively.

$$V1 = Vc1 + Vc2 \times Rcv/(2 \times Rcv + RL) \quad (2)$$

$$V3 = Vc3 + Vc2 \times Rcv/(2 \times Rcv + RL) \quad (3)$$

As indicated in the equations (2) and (3), the voltages between the CV terminals of the cells 1 and 3, conversely, increase due to the leakage current flowing through the leakage resistor 131 of the cell 2, and voltage values higher than their actual voltages are measured.

This is because the potential of the CV terminal connected to the voltage detection line SL2 decreases due to the cell voltage input resistor Rcv provided to the voltage detection line SL2, and the potential of the CV terminal connected to the voltage electric output line SL3 increases due to the cell voltage input resistor Rcv provided to the voltage detection line SL3.

In other words, the detection voltage of the cell above the voltage detection line provided with the cell voltage input resistor Rcv which causes voltage drop at the CV terminal by the leakage current increases, and the detection voltage of the cell below the voltage detection line provided with the cell voltage input resistor Rcv which causes voltage rise at the CV terminal by the leakage current also increases.

Figure 7:
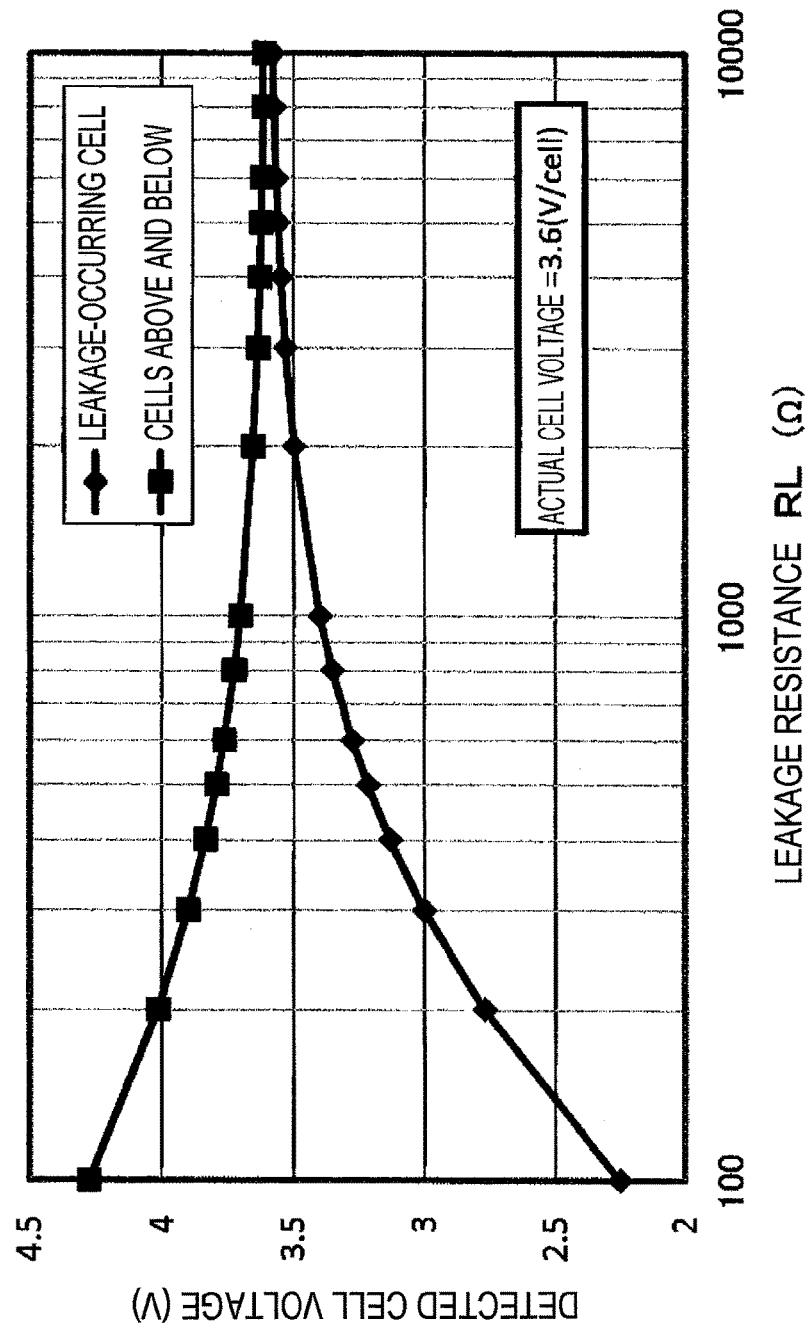
FIG. 7 is a diagram illustrating the relationship between the resistance value of a leakage resistor (RL) and the cell voltage detected when a voltage input resistor for voltage measurement is one certain value in a state where the actual voltages of battery cells of a cell group are in line.

FIG. 7 illustrates the relationship between the resistance value of the leakage resistor (RL) and the cell voltage detected, for example, when Vc1=Vc2=Vc3=3.6 V, and Rcv=30Ω for simplicity. As illustrated in the diagram, as the leakage resistance decreases, the detection voltage of the cell (the cell 2) where leakage has occurred decreases. Conversely, the cell detection voltages of the cells (the cells 1 and 3) above and below the cell where leakage has occurred increase. In this example, the resistance value of the leakage resistor (RL) 131 decreases to 100Ω, an actual voltage of 3.6 V decreases to a detection value of 2.25 V in the voltage across the terminals of the cell where leakage has occurred, and the detection voltages for the voltages across the terminals of the cells (the cells 2 and 3) above and below the cell (the cell 2) where leakage has occurred are detected as voltages exceeding 4.2 V.

As can be seen from the description below, generally, insulation failures such as the capacitor of the RC filter, the diode for protection against ESD in the cell controller IC 100, and a wiring pattern in the vicinity of the CV terminal of the cell controller IC 100 gradually progress. If the leakage suddenly increases at a certain point due to the influence of some noise or the like, the detection value of the cell voltage may exceed an overcharge protection voltage across 4.35 V past 4.2 V, and an abnormality may be detected as overcharge.

The overcharge protection voltage is a voltage at which charging is not allowed any more. Moreover, as illustrated in FIG. 5, heat generation is increased at a certain voltage or more in the lithium-ion battery. If the voltage further increases, the deterioration of the electrode and electrolyte (chemical reactions) occurs, and the battery is irreversibly deteriorated, and the voltage decreases once. Afterward, if charging is further continued, as described in FIG. 5, the electrolyte is decomposed to generate gas and accordingly the gas release vent operates.

Therefore, the overcharge protection voltage is set to a voltage which allows the heat generation problem. The voltage varies depending on the composition and structure of the lithium-ion battery. Accordingly, the above 4.35 V is merely an example of a certain lithium-ion battery. Moreover, there is also similarly an over-discharge protection voltage. However, its description is omitted here.

Figure 8:
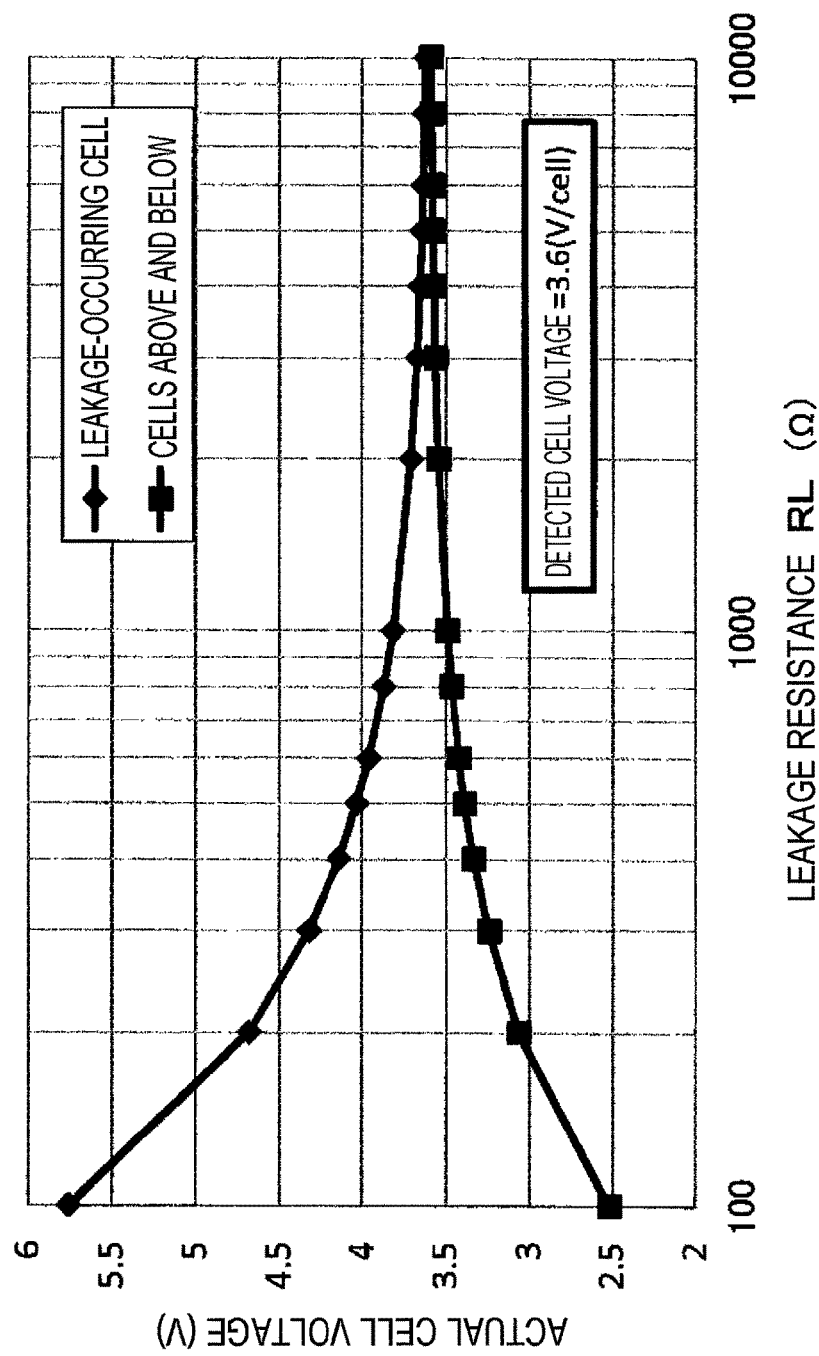
FIG. 8 is a diagram illustrating the relationship between the resistance value of the leakage resistor (RL) and the actual voltage of the battery cell when the voltage input resistor for voltage measurement is one certain value in a state where the detection voltages of the battery cells of the cell group are in line.

Contrary to FIG. 7, FIG. 8 illustrates the relationship between the actual voltage of each cell and the resistance value of the leakage resistor (RL) 131 when the detected voltages across the terminals of the battery cells are V1=V2=V3=3.6 V. Rcv=30Ω is also set here.

If the resistance value of the leakage resistor (RL) 131 is 300Ω, even if 3.6 V is detected in the measurement of the voltage across the terminals, the actual voltage of the cell where leakage is occurring is 4.35 V. Furthermore, if the leakage resistor RL decreases to 100Ω, the actual voltage of the leakage-occurring cell may reach approximately 5.8 V.

However, it is possible to prevent the actual voltage of the cell from reaching the overcharge protection voltage or more by using the assembly battery monitoring apparatus according to the present invention, where the balancing resistor 102 and the cell voltage input resistor 101 are set to appropriate values. Hereinafter, a description is given of the setting of the resistance values of the balancing resistor 102 and the cell voltage input resistor 101.

(Calculated Value of Balancing Current and Actual Current Value upon Occurrence of Leakage)

Balancing discharge upon the occurrence of leakage is described with reference to FIGS. 6, 7, and 9.

FIG. 7 illustrates a case where leakage occurred, for example, between two cell voltage input terminals 105 connected to the voltage detection lines SL2 and SL3 of the cell 2 in FIG. 6, and high voltages were detected in the cells 1 and 3 above and below the cell 2. However, assume that all the cells 1 to 3 have an actual voltage at substantially the same level (=3.6 V). Moreover, a calculation has been made as Rcv=30Ω.

As described in the equations (2) and (3), the actual voltages of the cells 1 and 3 are 3.6 V. However, if the resistance value of the leakage resistor (RL) 131 decreases, a voltage detected increases. Moreover, the detection voltage of the cell 2 conversely decreases. However, the magnitude of the decrease in the detection voltage of the cell 2 is larger than the magnitude of the increase in the detection voltages of the cells 1 and 3. If the detection voltage is too low, it is determined to be over-discharged. An alert is issued and a measure such as the stop of use of the battery system is taken. However, in a case of over-discharge, problems such as heat generation, and an increase in pressure in the cell do not occur unlike the case of overcharge. A description is given of an operation leading to overcharge and the operation of the battery system monitoring apparatus according to the invention to prevent the operation leading to overcharge.

Consider a case where the leakage resistor RL is 300Ω in FIG. 7. 3.9 V, which is higher than the actual voltage of 3.6 V, is detected as the voltage across the terminals (the cell voltage) in the cells 1 and 3 above and below the cell 2 where leakage has occurred. If the variation in cell voltage occurs in this manner in a plurality of battery cells of the battery system, the operation of reducing the detected voltage, in other words, balancing discharge is performed on the battery cell having a high cell voltage. Balancing discharge is performed while the balancing switch (BSW) 108 is ON as illustrated in FIG. 6. Consequently, a balancing discharge current (IB) 133 flows.

Balancing discharge time is calculated based on the balancing current calculated from the detected cell voltage and the balancing resistance, and the SOC of the cell. There are various calculation methods, and their descriptions are omitted here.

Balancing discharge is performed based not on the actual voltage but on the detected voltage of the cell. Therefore, the calculated balancing current is larger by approximately 8.3% (3.9 V/3.6 V=1.083) than one based on the actual voltage. If discharging is performed in this state, a planned current amount is not discharged. Accordingly, the voltage across the cell after the end of discharging does not decrease to an originally planned voltage. The voltage detected after the end of discharging is a slightly higher voltage in a state where balancing is not attained. If the slightly higher voltage is detected, balancing discharge is performed again, which results in the performance of such balancing discharge that solves the variation in the detected voltages.

Figure 9:
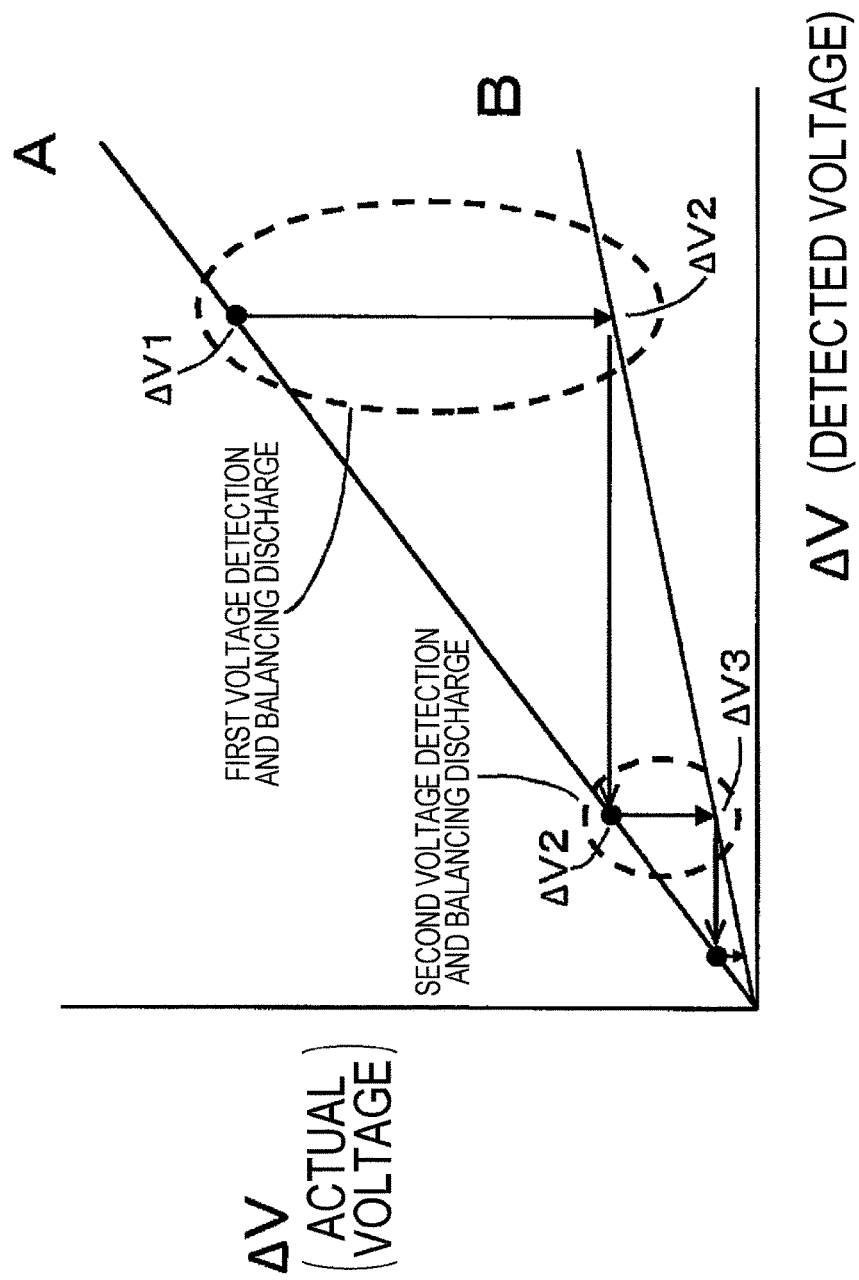
FIG. 9 is a diagram schematically illustrating the state of balancing discharge of the cell where a high voltage has been detected upon the occurrence of leakage.

FIG. 9 schematically illustrates the state of balancing discharge. A straight line A indicates that the actual voltage agrees with the detection voltage with respect to a magnitude $\Delta V$ of a discharging target with a variation in the voltages across the terminals of the cells. A straight line B indicates that $\Delta V$ is not solved due to the above reason and the actual voltage does not decrease to a planned voltage.

Even if first balancing discharge is performed at an originally detected cell voltage, $\Delta V$ of the actual voltage decreases only to the straight line B ($\Delta V2$) from the straight line A ($\Delta V1$). The voltage ($\Delta V2$) which has not attained balancing discharge is detected on the next measurement of the voltages across the terminals of the cells, and further balancing discharge is performed (the second balancing discharge). In this manner, balancing discharge is performed based on the detection voltage. The actual voltage also decreases in the end by the variation ΔV in cell voltage based on the detection voltage.

In this manner, the variation in the voltages across the terminals of the plurality of cells is solved by balancing discharge. However, the voltage across the terminals is based not on the actual voltage but on the detection voltage. The voltages of all the cells may be adjusted in line with a low voltage once by balancing discharge and the cells are further charged, or balancing discharge and charging may be alternated. If the detection voltages of all the cells are adjusted in line with 3.6 V after charging, the actual voltage of the cell is a value in accordance with the leakage resistance based on the graph illustrated in FIG. 8. For example, when the leakage resistance is 300Ω, the cells 1 and 3 are 3.25 V, and the cell 2 is 4.35 V.

The balancing resistor (Rb) 102 is several tens Ω to several hundreds Ω. However, with the on/off switching control (duty control) of the balancing switch (BSW) 108, the average current can be decreased as appropriate. In other words, with the duty control of the BSW 108, it is allowed to have a balancing resistance $Rb_{ef}$ where the resistance value can be changed effectively. Also in the following description, the balancing resistance is assumed to be the effective balancing resistance $Rb_{ef}$ including the duty control.

(Overcharge of Leakage-Occurring Cell by Balancing Discharge)

Figure 10:
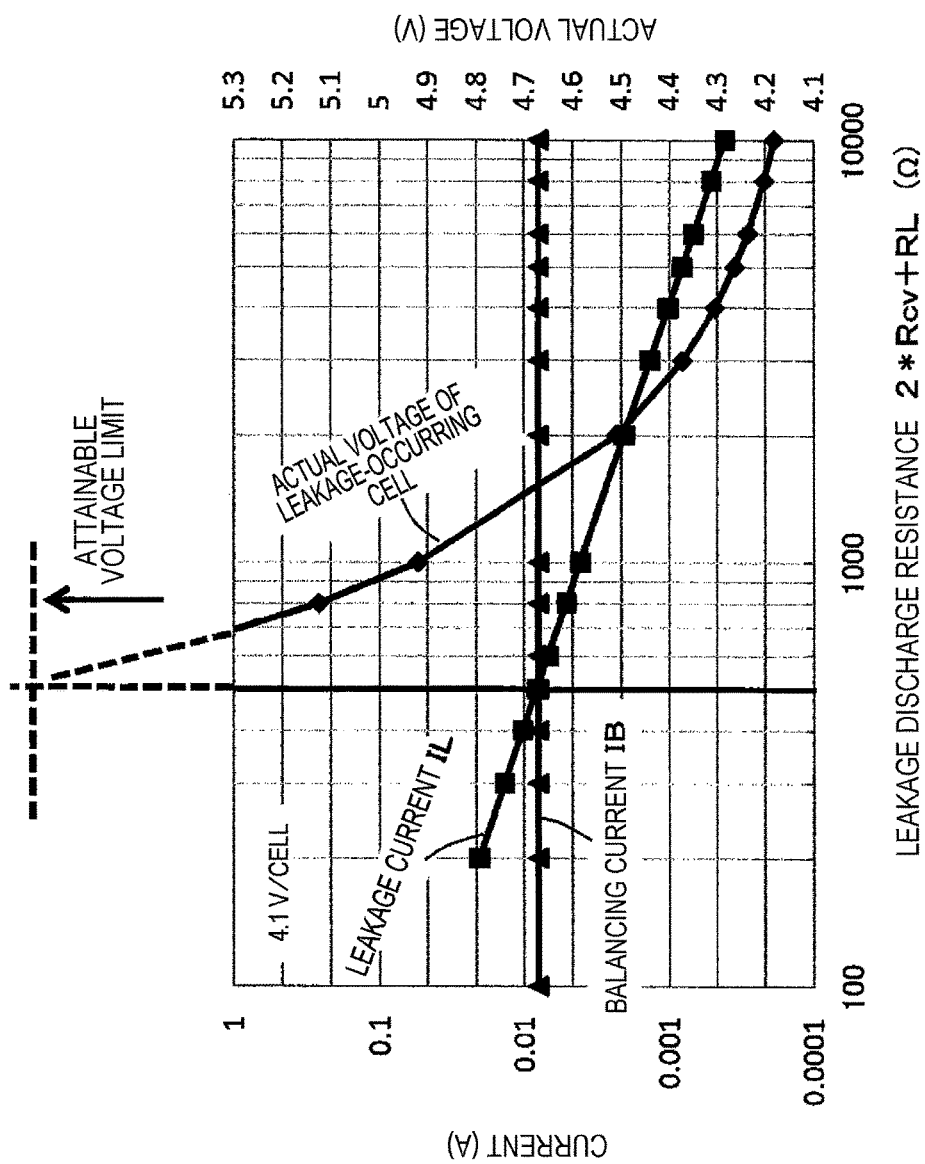
FIG. 10 is a diagram illustrating to what level the actual voltage of the voltage across the terminals of the cell having leakage may increase based on the relationship between a leakage current and a balancing current.

FIG. 10 illustrates to what level the actual voltage for the voltage across the terminals of the cell having leakage may increase based on the relationship between the leakage current and the balancing current. However, it is assumed here that at the beginning the actual voltages for the voltages across the terminals of all the cells are 4.1 V, in other words, a voltage normally corresponding to an SOC of 100%. Moreover, the cell voltage input resistor (Rcv) 101 is set to 100Ω.

In line with the description of FIG. 6, the leakage current (IL) 132 is calculated by the following equation (4).

$$IL = Vc2/(2 \times Rcv + RL) \tag{4}$$

However, the horizontal axis of FIG. 10 indicates not a pure leakage resistance RL but a leakage discharge resistance 2×Rcv+RL in order to calculate the leakage current. Therefore, RL=0Ω at 200Ω on the horizontal axis, which is the maximum leakage current.

Assuming that the effective balancing resistance $Rb_{ef}$ is approximately 512Ω, as described above, the balancing current IB can be considered with the actual voltage. Therefore, IB=4.1 V/512 Ω=0.008 A.

The leakage current IL increases as the leakage resistance RL becomes lower, and intersects with the balancing current at a leakage discharge resistance 2×Rcv+RL of 512Ω. The leakage resistor (RL) 131 is approximately 312Ω at this intersection.

In FIG. 10, the balancing current is larger than the leakage current in an area where the leakage discharge resistance is larger than 512Ω. In the battery system, not only balancing discharge but also charging is also performed on all the cells as appropriate. In such a state, balancing discharge is not performed on the battery cell where leakage is occurring. Accordingly, the battery cell is charged by the amount of balancing discharge and its actual cell voltage increases. The actual voltage of the cell having leakage is shown as a curve of the "actual cell voltage" of FIG. 10.

To put the above description another way, if the effective balancing resistance $Rb_{ef}$ agrees with the leakage discharge resistance, the balancing current agrees with the leakage current. Accordingly, if the detection voltages for all the cell voltages are adjusted to a voltage V (F, D) (where F is full charge, and D is the detection voltage) corresponding to the voltage at SOC=100% by balancing discharge after the occurrence of leakage, the actual voltage V (F, R) (where F is full charge, and R is the actual voltage) of the cell having leakage may increase to a voltage indicated by the following equation (5).

$$V(F,R) = V(F,D) \times (Rb_{ef} + Rcv)/Rb_{ef} \tag{5}$$

Here, $Rb_{ef} = 2 \times Rcv + RL$.

Figure 11:
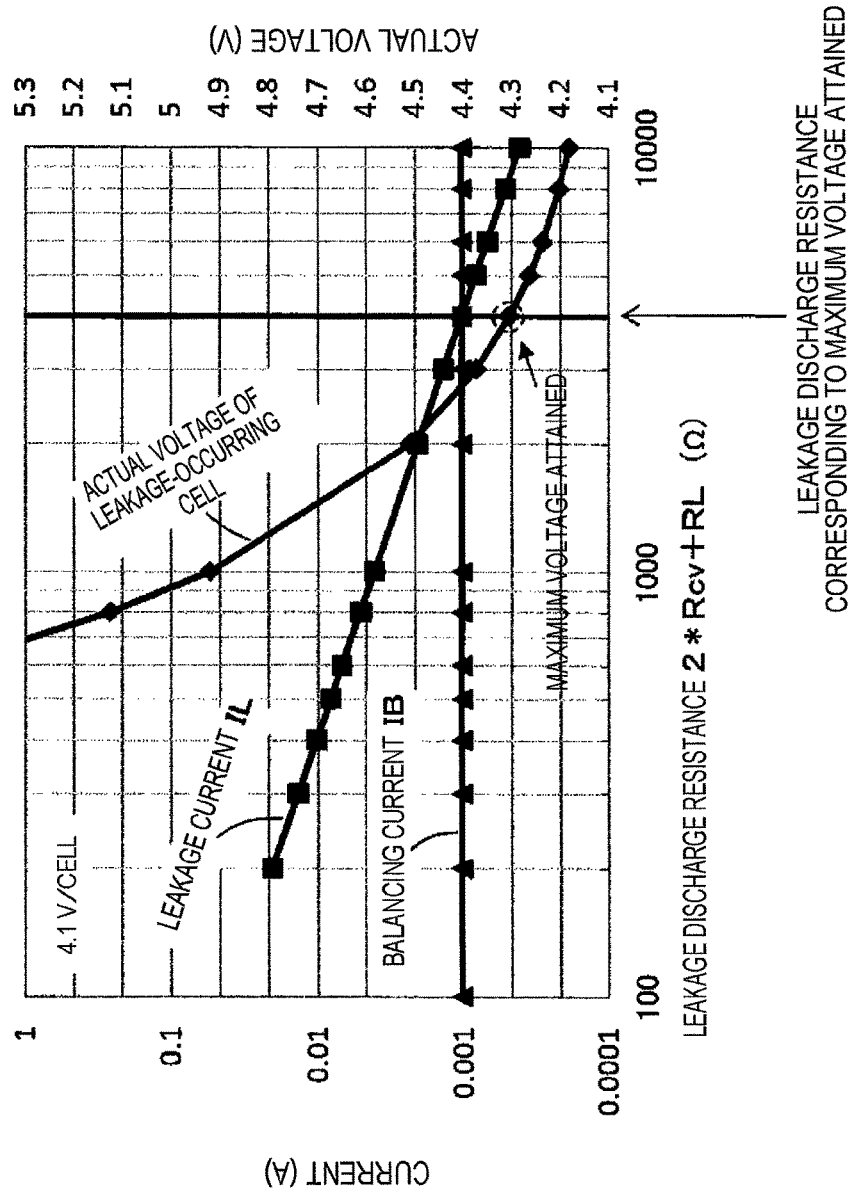
FIG. 11 is a diagram illustrating control for setting the actual voltage of the cell having leakage equal to or less than a voltage around an overcharge protection voltage.

The actual voltage of the leakage-occurring cell illustrated in FIGS. 10 and 11 is indicated by the equation (5).

Generally, leakage begins with a slight amount and the leakage current gradually increases. In other words, the leakage resistance is large at the beginning of the occurrence of leakage, but gradually decreases and the leakage current increases.

In FIG. 10, the leakage resistance begins with a large value on the right side of the diagram, and proceeds toward the left side. However, the actual voltage of the cell having leakage increases until a leakage discharge resistance of 512Ω. The leakage current is larger than the balancing current at 512Ω or less. Accordingly, the actual voltage of the cell having leakage conversely decreases.

Therefore, a case where the highest actual voltage may occur is a case where the leakage resistance is 312Ω (the leakage discharge resistance is 512Ω). In this case, the voltage may increase up to the attainable voltage limit illustrated on the upper side of FIG. 10.

FIG. 11 is a diagram illustrating control for setting the actual voltage of the cell having leakage equal to or less than 4.30 V, which is the above voltage around the overcharge protection voltage. Assume that the actual voltages of all the cells are 4.1 V at the beginning also in FIG. 11 as in the case of FIG. 10.

As can be seen from the above description, it is set such that the straight line of the leakage current IL intersects with the straight line of the balancing current at a leakage discharge resistance of 4000Ω where the maximum voltage attained is 4.30V, in order to set the maximum voltage attained of the actual voltage of the cell having leakage to 4.30 V.

The balancing switch duty of the balancing switch 108 is controlled to set the effective resistance value $R_{ef}$ to the leakage discharge resistance of 4000Ω.

The following shows the above-described balancing discharge upon the occurrence of leakage, which is summarized again to further facilitate understanding.

V(F, D) of the equation (5) is a voltage when the battery cell has SOC=100%. Accordingly, this is further set as $V_F$. Moreover, V(F, R) is the maximum voltage attained illustrated in FIGS. 10 and 11 to prevent a further increase in voltage, and this is set as $V_{max}$. In other words, the equation (5) is expressed in an equivalent equation (6).

$$V_{max} = V_F \times (Rb_{ef} + Rcv)/Rb_{ef} \tag{6}$$

However, $V_{max} = V(F, R)$, $V_F = V(F, D)$, $Rb_{ef}$=effective balancing resistance.

When the equation (6) is transformed, the relationship between $Rb_{ef}$ and Rcv becomes clear.

$$Rb_{ef} = Rcv \times V_F/(V_{max} - V_F) \tag{7}$$

$V_{max}$ is the above-mentioned overcharge protection voltage, $V_F$ is the cell voltage at an SOC of 100%, and $Rb_{ef}$ is the effective balancing voltage, in other words, $Rb_{ef} = Rb \times$ duty cycle.

Normally, the constant of the RC filter configured of the cell voltage input resistor (Rcv) 101 and the capacitor 103 is firstly set to remove noise superimposed on the terminal voltage of each battery cell input into the cell voltage input terminal (CV terminal) 105.

If the effective balancing resistance corresponding to the resistance value of Rcv is set equal to or more than the value obtained from the $Rb_{ef}$ equation (7), the actual voltage of the cell having leakage can be set equal to or less than the overcharge protection voltage $V_{max}$.

As described above, the present invention focuses on that overcharging in the cell balancing operation upon the occurrence of leakage is performed at a current obtained by subtracting the leakage current from the balancing current, and sets the balancing current so as to keep a current which actually attains within a range of voltage where the battery is safe.

In order to achieve this, the effective resistance of the balancing resistor is determined from the resistance value of the RC filter, the upper limit voltage for use of the cell, and the overcharge protection voltage such that the sum of the voltage at an SOC of 100% being the upper limit voltage for use of the cell, and a voltage detection error when the leakage current equal to the balancing current flows is within the safe voltage range, in other words, equal to or less than the overcharge protection voltage.

In other words, the effective balancing resistance value set in the above equation (7) is set and accordingly even if leakage occurs somewhere on the input side of the voltage measurement circuit of the cell controller IC, overcharge upon the occurrence of leakage can be avoided.

In the above description, the operation of the assembly battery monitoring apparatus according to the present invention has been described taking, as an example, one cell group 120 and the cell controller IC 100 which monitors the cell group 120. Moreover, the balancing discharge operation of the assembly battery monitoring apparatus has been described assuming leakage occurred in the cell in the middle of three battery cells.

If leakage occurs in the highest (on the high potential side) or the lowest (on the low potential side) of the plurality of the battery cells 110 of the cell group 120, it is clear from the description of the equation (2) or (3) that a similar method to the above description can be applied to a lower cell adjacent to the highest cell or a higher cell adjacent to the lowest cell.

(Balancing Discharge in Modifications 1 and 2 of RC Filter Circuit)

In the above description, it is assumed that the capacitor of the RC filter is connected between the voltage detection terminals (CV terminals) of the cell controller IC 100. However, there are cases where the capacitor of the RC filter is connected to the ground (GND) of the cell controller IC 100 (Modification 1 of the RC filter circuit, FIG. 3), connected to the voltage detection line of the midpoint potential of a certain cell group (Modification 2 of the RC filter circuit, FIG. 4), or connected to another point. Also in that case, voltage drop occurs in R (Rcv) of the RC filter and a decrease in the cell voltage detection value occurs since the leakage current flows through the capacitor. Accordingly, similar consideration can be given.

In other words, the detection voltage of the cell using the voltage detection line through which the leakage discharge current flows as the voltage detection line of the cell voltage is influenced by leakage, and increases. The cell whose detection voltage has decreased is overcharged by the amount of the balancing current. Accordingly, the attained voltage of the overcharge is the sum of an error occurring when the leakage current having the same value as the balancing current value flows and the upper limit voltage for use of the cell.

Also in these modifications of the RC filter circuit, it is possible to similarly obtain the relationship between the cell voltage input resistance Rcv and the effective balancing current $Rb_{ef}$ on the condition that the leakage discharge current and the balancing discharge current have the same magnitude as described above.

In order to simplify the description, it is assumed that the actual voltages of all the battery cells when the occurrence of leakage is detected are the same and the detection voltages of all the battery cells after charge/discharge are the same. This is a condition equivalent to the description of the RC filter circuit of FIG. 2.

In FIG. 2, the voltage applied to the capacitor of the RC filter circuit is equal to one battery cell. However, in the cases of FIGS. 3 and 4, the applied voltage increases by the number of cells between two voltage detection lines connected to the capacitor, compared with the case of FIG. 2.

Therefore, the leakage discharge current also increases by the number of cells. In order to pass the same balancing discharge current as this, the effective balancing resistance is set to a value reduced by the number of cells compared with the case of the description of the RC filter circuit of FIG. 2.

For example, if leakage occurs in the capacitor 103 connected between the voltage detection line SL2 and the ground line (GL) in the RC filter circuit of FIG. 3, the potential of the CV terminal connected to the voltage detection line SL2 decreases and the detection voltage of the cell (the cell 1) above the voltage detection line SL2 increases due to the leakage discharge current.

The magnitude of an increase in the detection voltage is tripled compared with the case of FIG. 2 since there are three battery cells between the voltage detection lines SL2 and SL5. The leakage discharge current is tripled accordingly and the effective balancing resistance to balance this decreases to ⅓.

However, if the occurrence of leakage is detected in one capacitor 103, deterioration may have started also in other capacitors. Alternatively, the deterioration of the insulation may have started also in parts other than the capacitors, for example, the wiring pattern in the vicinity of the cell voltage input terminal (CV terminal) 105 of the cell controller IC 100. From the viewpoint of safety, for example, even in the case of leakage between the voltage detection line SL2 and the ground line (GL) of FIG. 3 as in the above description, it is desirable that the duty cycle of the balancing switch of the cell 1 be not set to ⅓ but the effective balancing resistance for a voltage equivalent to one cell, which is calculated by the equation (7).

In the above description, the case where the capacitors 103 of the RC filter circuit are connected as illustrated in FIGS. 2 to 4 has been described. As described above, it is clear that a similar balancing operation to the above description is possible even in a circuit configuration where the capacitor 103 is connected at one end to the power line (VL) instead of the circuit configuration where the capacitor 103 is connected at one end to the ground line (GL). The detailed description is omitted. However, also in this case, similarly to the above description, the detection voltage of the cell above the voltage detection line provided with Rcv which causes voltage rise at the CV terminal due to the leakage current decreases, and the detection voltage of the cell above the voltage detection line provided with Rcv which causes voltage drop at the CV terminal due to the leakage current increases.

Moreover, in the above description, the description has been given assuming that leakage occurs in the capacitor 103 of the RC filter. However, leakage may occur due to causes other than this, for example, an insulation failure at the voltage input terminal (between the CV terminals) of a wiring board, and an insulation failure of the diode for protection against ESD in the cell controller IC 100. However, these cases can also be understood in the same manner as the above case of leakage in the capacitor. Accordingly, these descriptions are also omitted.

The above description is examples of the embodiments of the present invention, and the present invention is not limited to these embodiments. Those skilled in the art can make various modifications without impairing the features of the present invention. Therefore, other modes which are conceivable within the scope of the technical idea of the present invention are also included in the scope of the present invention.

The invention claimed is:

1. A battery system monitoring apparatus for monitoring a plurality of battery cells connected in series, the battery system monitoring apparatus comprising:
   a cell controller integrated circuit (IC) that monitors and controls discharge of the plurality of battery cells, the cell controller IC including a power supply terminal, a ground terminal, a plurality of balancing switches and a plurality of cell voltage inputs;
   a power line circuit that includes:
      a power line that connects a positive electrode of a first battery cell that has a highest potential among the plurality of battery cells to the power supply terminal,
      a first input resistor that is connected in series between the positive electrode of the first battery cell and a first cell voltage input from the plurality of cell voltage inputs, wherein the first input resistor is connected to the first cell voltage input via a first wire,
      a first capacitor that is connected to the first wire and a midpoint potential voltage detection line, and
      a first balance line that is connected to the power line, the positive electrode of the first battery cell and a first balance switch from the plurality of balancing switches;
   a ground line circuit that includes:
      a ground line that connects a negative electrode of a last battery cell that has a lowest potential among the plurality of battery cells to the ground terminal,
      a last input resistor that is connected in series between the negative electrode of the last battery cell and a last cell voltage input from the plurality of cell voltage inputs, wherein the last input resistor is connected to the last cell voltage input via a last wire,
      a last capacitor that is connected to the ground line and the midpoint potential voltage detection line, and
      a last balance line that is connected to the negative electrode of the last cell, the last input resistor and a last balance switch from the plurality of balancing switches, wherein the last balance includes a last balancing resistor between the negative electrode and the last balance switch; and
   a plurality of RC circuits that are each connected to a respective battery cell from the plurality of battery cells other than the first cell and the last cell, wherein each respective RC circuit from the plurality of RC circuits includes:
      a respective input resistor that is connected in series between a positive terminal of the respective battery cell and a respective cell voltage input from the plurality of cell voltage inputs, wherein the respective input resistor is connected to the respective cell voltage input via a respective wire,
      a respective capacitor that is connected to the respective wire and the midpoint potential voltage detection line,
      a first respective balance line connected to the positive terminal of the respective battery cell and a second terminal of a first respective balance switch from the plurality of balancing switches via a respective balance resistor, and
      a second respective balance line connected to the first respective balance line, the positive electrode of the respective battery cell, the respective input resistor and a first terminal of a second respective balance switch from the plurality of balancing switches.

2. The battery system monitoring apparatus according to claim 1, comprising a plurality of the cell controller ICs to monitor a plurality of cell groups.

3. The battery system monitoring apparatus according to claim 1, wherein a resistance value for each respective balance resistor is determined based on a resistance of the first input resistor, an overcharge protection voltage value of the battery cell, and a voltage value when the battery cell has a state of change (SOC) of 100%.

4. The battery system monitoring apparatus according to claim 3, wherein a resistance value for each respective balance resistor is determined based on a resistance of the first input resistor and a duty cycle of on and off of the plurality of balancing switches.

5. An electric storage device including the battery system monitoring apparatus according to claim 1, and a battery system.

6. An electric drive apparatus comprising the electric storage device according to claim 5.

* * * * *